(12) United States Patent
Ekshinge et al.

(10) Patent No.: US 11,906,379 B2
(45) Date of Patent: Feb. 20, 2024

(54) INSULATED STRUCTURE FOR AN APPLIANCE

(71) Applicant: WHIRLPOOL CORPORATION, Benton Harbor, MI (US)

(72) Inventors: Sunil Shivaji Ekshinge, Pune (IN); Omkar Sunil Mithari, Pune (IN); Caroline Paiva Torres, Joinville (BR); Sanjesh Kumar Pathak, Stevensville, MI (US); Paul Bennett Allard, Coloma, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 151 days.

(21) Appl. No.: 17/542,785

(22) Filed: Dec. 6, 2021

(65) Prior Publication Data

US 2023/0175912 A1    Jun. 8, 2023

(51) Int. Cl.
| | |
|---|---|
| *G01L 19/14* | (2006.01) |
| *F16L 59/065* | (2006.01) |
| *F25D 23/06* | (2006.01) |
| *F25D 29/00* | (2006.01) |

(52) U.S. Cl.
CPC .......... *G01L 19/149* (2013.01); *F16L 59/065* (2013.01); *F25D 23/065* (2013.01); *F25D 29/005* (2013.01); *F25D 2201/14* (2013.01); *F25D 2700/00* (2013.01)

(58) Field of Classification Search
CPC ...... G01L 19/149; F16L 59/065; F25D 29/00; F25D 29/005; F25D 2700/00; F25D 2201/14; F25D 23/065
See application file for complete search history.

(56) References Cited

U.S. PATENT DOCUMENTS

| | | | |
|---|---|---|---|
| 8,449,177 B2 | 5/2013 | Kvisteroy et al. | |
| 9,321,237 B2 | 4/2016 | Hiemeyer et al. | |
| 9,400,133 B2 * | 7/2016 | Miyaji | ................. F25D 23/065 |
| 10,781,963 B2 | 9/2020 | Uekado et al. | |
| 10,941,975 B2 | 3/2021 | Choi et al. | |
| 10,995,488 B1 | 5/2021 | Allard et al. | |
| 2013/0291646 A1 * | 11/2013 | Weisser | .............. G01L 19/0007 73/756 |
| 2014/0346942 A1 * | 11/2014 | Kim | ...................... F25D 23/064 29/530 |

(Continued)

FOREIGN PATENT DOCUMENTS

| | | | | |
|---|---|---|---|---|
| DE | 102012223541 A1 * | 6/2014 | ............. | F25D 23/04 |
| EP | 1338854 A1 * | 8/2003 | ........... | F25D 23/063 |

(Continued)

*Primary Examiner* — Andrew M Roersma
(74) *Attorney, Agent, or Firm* — Price Heneveld LLP

(57) ABSTRACT

An insulated structure for an appliance includes a plurality of walls, a cavity defined by the plurality of walls, and an aperture defined by one of the plurality of walls. The aperture is employed in evacuating the cavity to establish a less-than-atmospheric pressure within the cavity. A base structure is coupled to an interior surface of the one of the plurality of walls that defines the aperture. The base structure is aligned with the aperture. A pressure sensor is received by the base structure. The base structure and the pressure sensor together define a pressure-sensing assembly.

19 Claims, 10 Drawing Sheets

(56) References Cited

U.S. PATENT DOCUMENTS

| | | | |
|---|---|---|---|
| 2016/0116206 A1* | 4/2016 | Kempfle | F25D 17/047 |
| | | | 312/405 |
| 2016/0313055 A1* | 10/2016 | Heydel | F25D 17/047 |
| 2016/0377339 A1* | 12/2016 | Kempfle | F25D 23/068 |
| | | | 312/406 |
| 2018/0155975 A1* | 6/2018 | Kempfle | F25D 17/047 |
| 2018/0313492 A1* | 11/2018 | Kitano | F25D 23/064 |
| 2020/0033049 A1 | 1/2020 | Dherde et al. | |
| 2020/0132243 A1 | 4/2020 | Vaze et al. | |
| 2020/0278149 A1 | 9/2020 | Ekshinge et al. | |
| 2023/0194372 A1* | 6/2023 | Allard | G01L 21/00 |
| | | | 49/70 |

FOREIGN PATENT DOCUMENTS

| | | | | |
|---|---|---|---|---|
| EP | 1621860 A1 * | 2/2006 | | G01L 9/007 |
| EP | 3683487 A1 | 7/2020 | | |
| EP | 3693649 A1 | 8/2020 | | |
| JP | H10239199 A | 9/1998 | | |
| JP | 2012136254 A | 7/2012 | | |
| WO | WO-2012017903 A1 * | 2/2012 | | F16L 59/065 |

\* cited by examiner

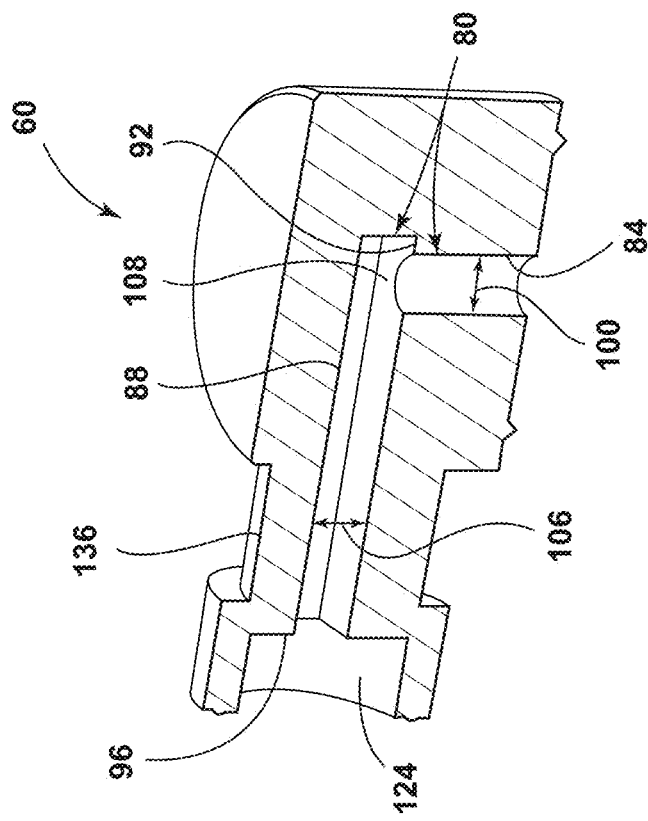
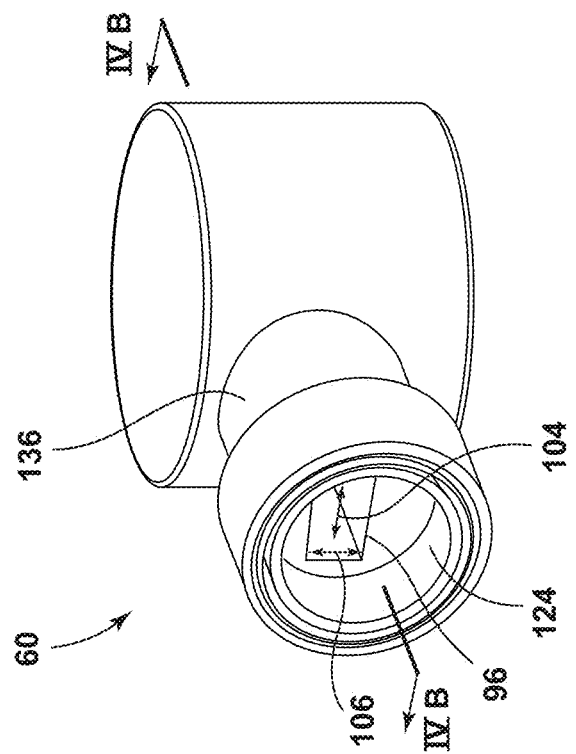
FIG. 4B
FIG. 4A

INSULATED STRUCTURE FOR AN APPLIANCE

BACKGROUND OF THE DISCLOSURE

The present disclosure generally relates to an insulated structure, and more specifically, to an insulated structure for an appliance.

SUMMARY OF THE DISCLOSURE

According to one aspect of the present disclosure, an insulated structure for an appliance includes a plurality of walls, a cavity defined by the plurality of walls, and an aperture defined by one of the plurality of walls. The aperture is employed in evacuating the cavity to establish a less-than-atmospheric pressure within the cavity. A base structure is coupled to an interior surface of the one of the plurality of walls that defines the aperture. The base structure is aligned with the aperture. A pressure sensor is received by the base structure. The base structure and the pressure sensor together define a pressure-sensing assembly.

According to another aspect of the present disclosure, an insulated structure for an appliance includes a plurality of walls, a cavity defined by the plurality of walls, and an aperture defined by one of the plurality of walls. The aperture is employed in evacuating the cavity to establish a less-than-atmospheric pressure within the cavity. A base structure is coupled to an interior surface of the one of the plurality of walls that defines the aperture. The base structure is aligned with the aperture. The base structure defines one or more channels. At least one of the one or more channels is positioned over the aperture. A pressure sensor is received by the base structure. The base structure and the pressure sensor together define a pressure-sensing assembly. The pressure sensor is a microelectromechanical system. A cover is removably coupled to the aperture. A position of the pressure-sensing assembly remains constant independent of whether the cover is in a coupled state or a decoupled state relative to the aperture. The pressure-sensing assembly fits below the cover when the cover is in the coupled state.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 4A is a front perspective view of a base structure of the pressure-sensing assembly, according to one example;

FIG. 4B is a cross-sectional view of the base structure of FIG. 4A, taken along line IVB-IVB of FIG. 4A, illustrating an internal arrangement thereof, according to one example;

Figure 1:
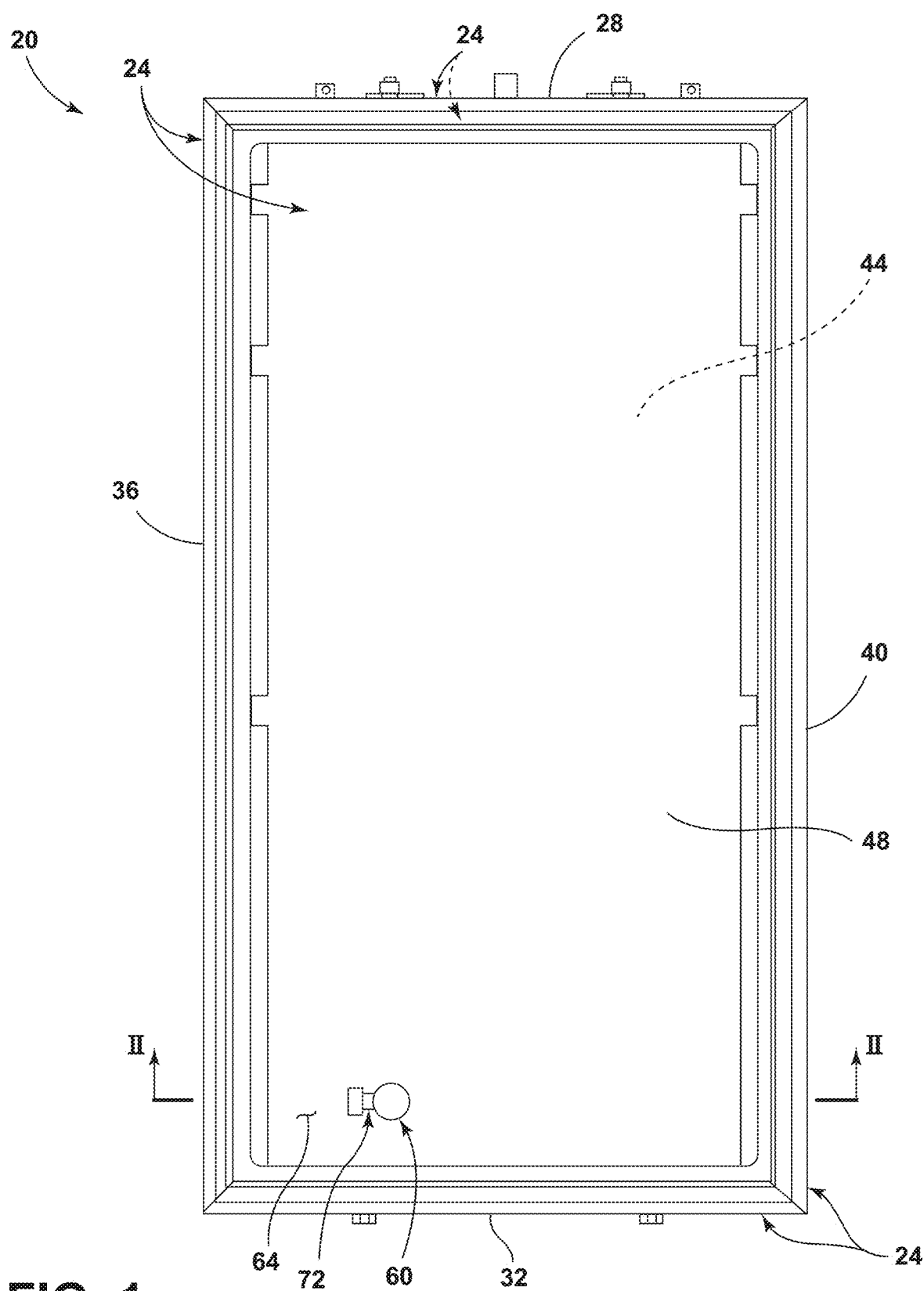
FIG. 1 is a rear view of an insulated structure, illustrating a pressure-sensing assembly coupled thereto, according to one example.
Figure 2:
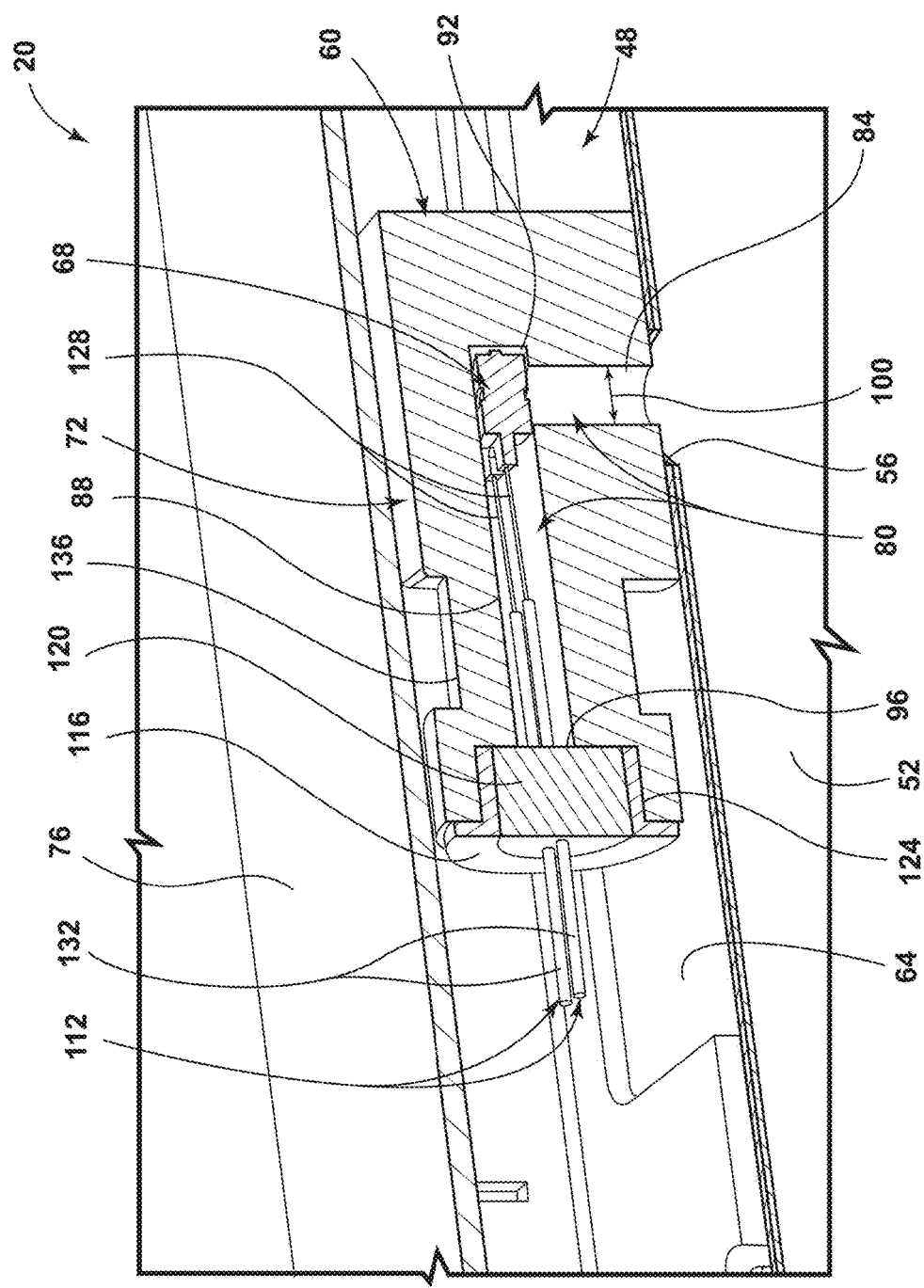
FIG. 2 is a cross-sectional view of the insulated structure, taken along line II-II of FIG. 1, illustrating components of the pressure-sensing assembly, according to one example.
Figure 3:
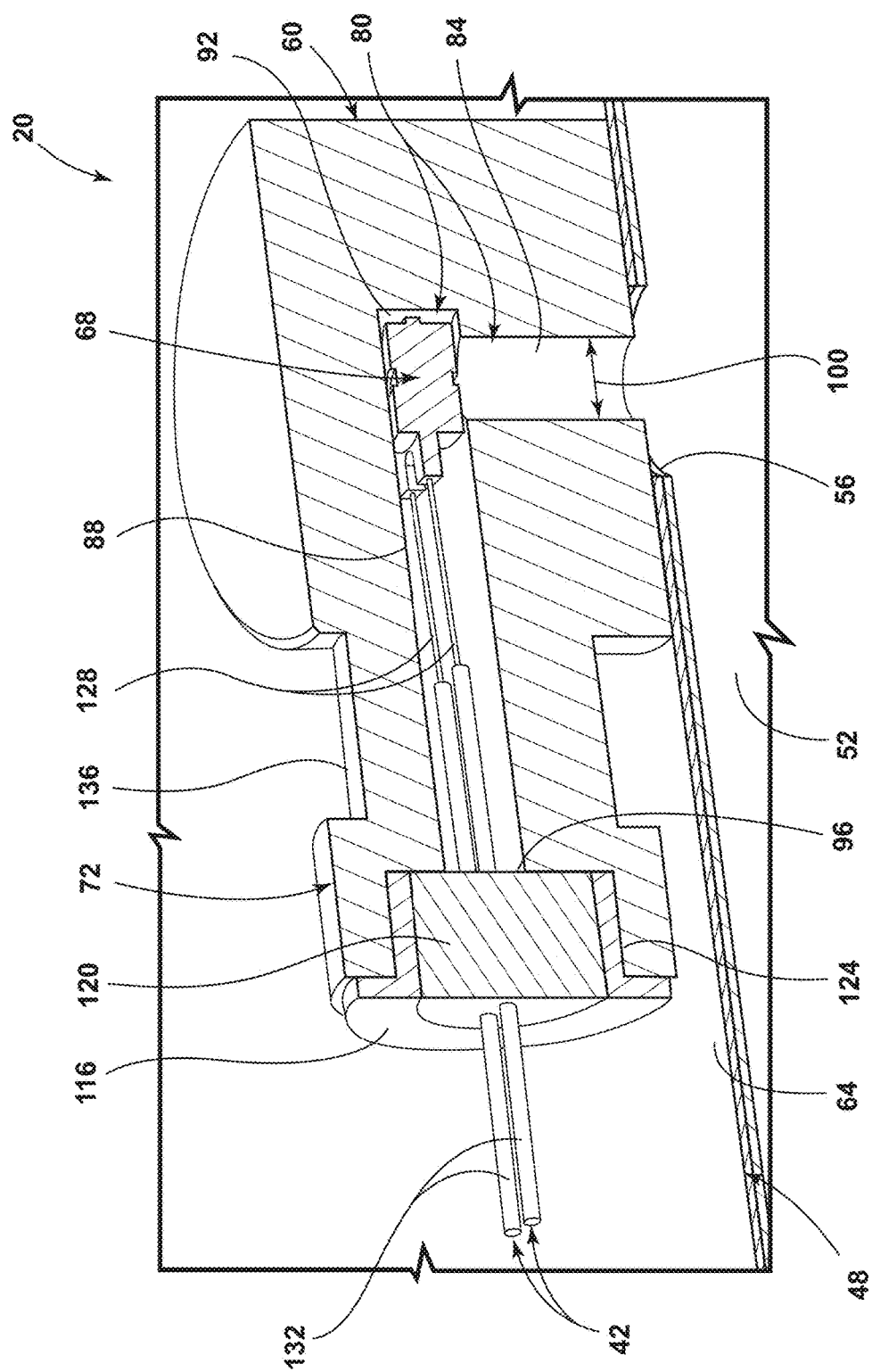
FIG. 3 is an expanded view of the pressure-sensing assembly of FIG. 2.
Figure 4C:
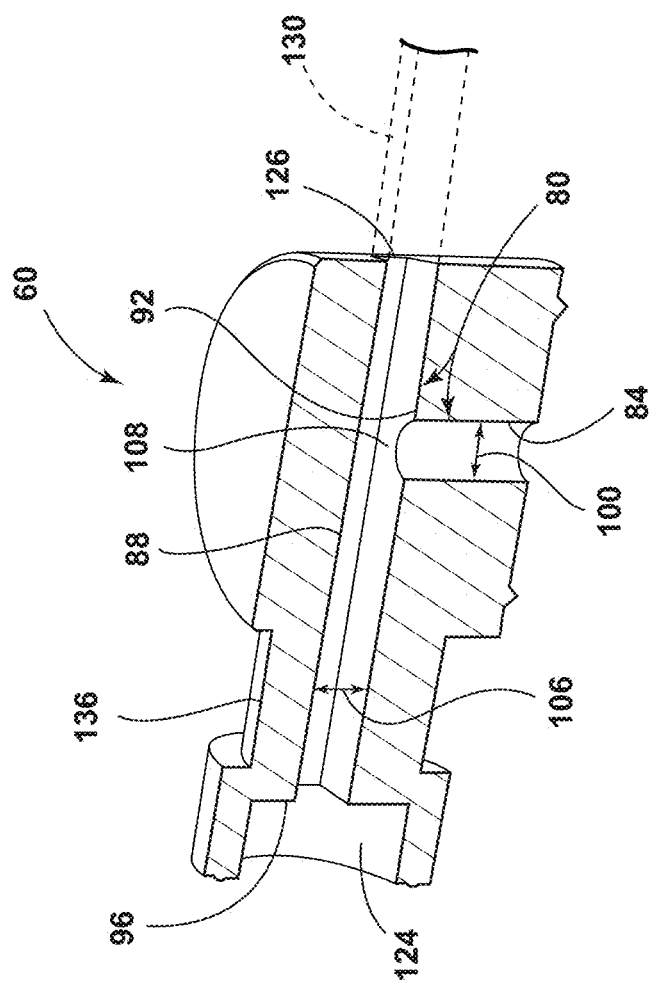
FIG. 4C is a cross-sectional view of the base structure of FIG. 4A, taken along line IVB-IVB of FIG. 4A, illustrating the internal arrangement thereof, according to another example.
Figure 5:
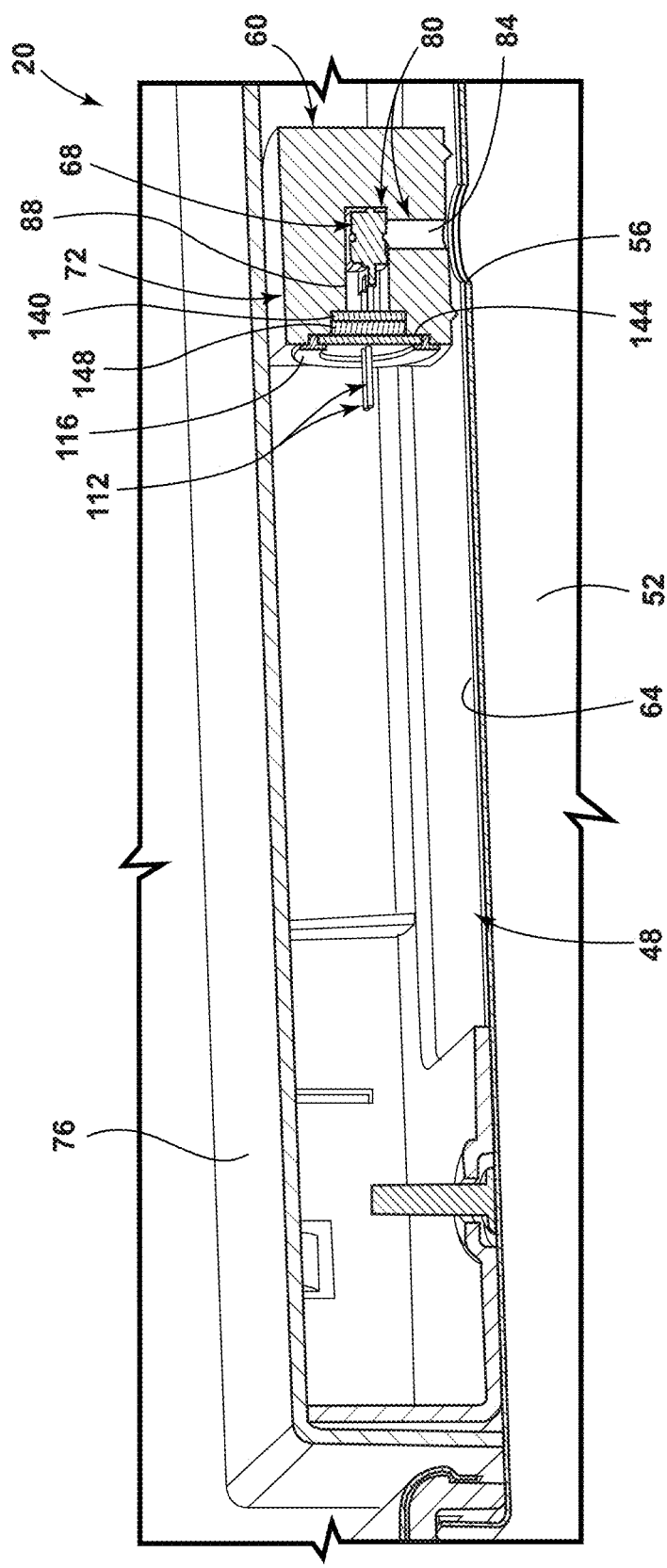
FIG. 5 is a cross-sectional view of the insulated structure, taken along line II-II of FIG. 1, illustrating components of the pressure-sensing assembly, according to another example.
Figure 6:
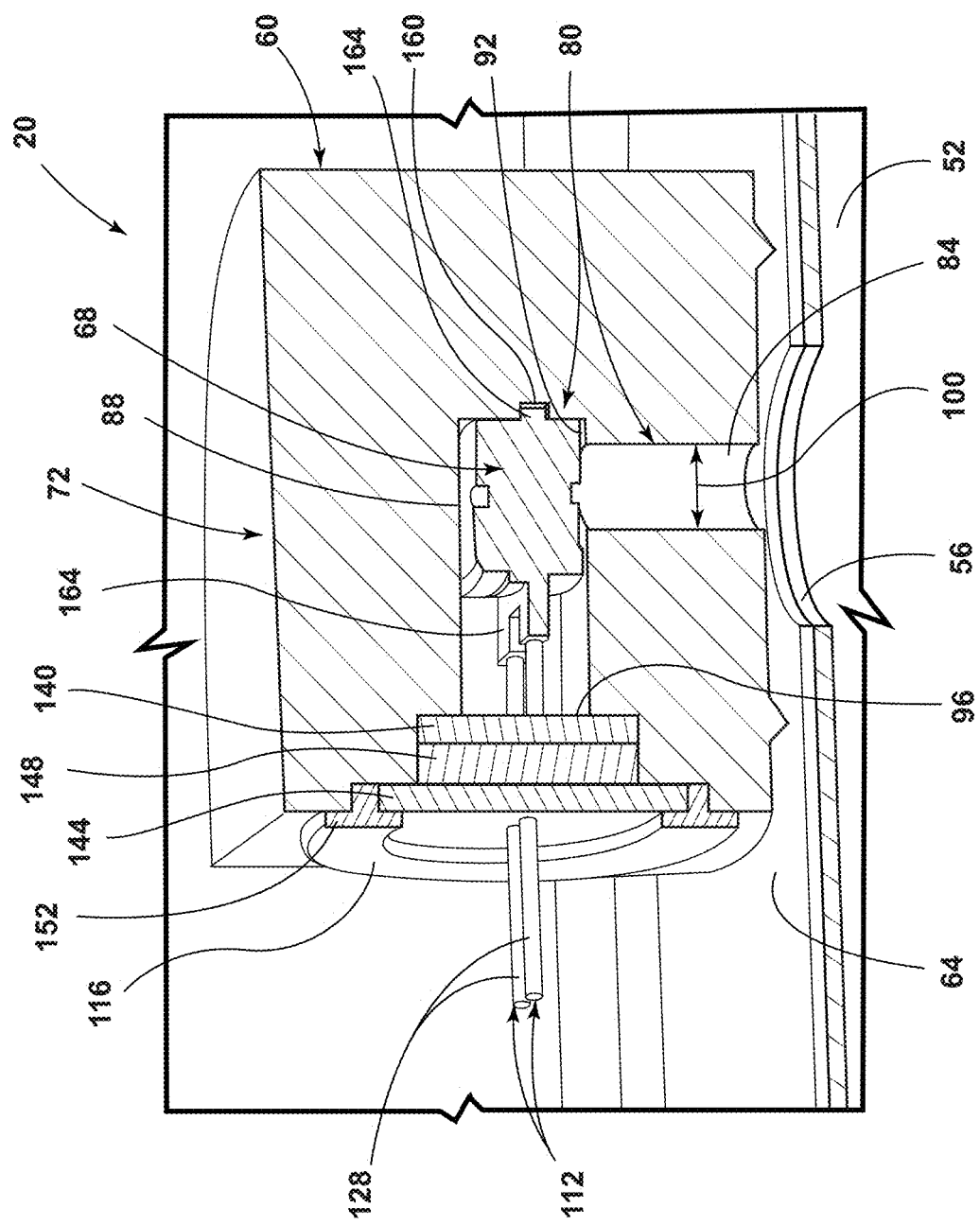
FIG. 6 is an expanded view of the pressure-sensing assembly of FIG. 5.

The components in the figures are not necessarily to scale, emphasis instead being placed upon illustrating the principles described herein.

DETAILED DESCRIPTION

The present illustrated embodiments reside primarily in combinations of method steps and apparatus components related to an insulated structure. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-10, reference numeral 20 generally designates an insulated structure. The insulated structure 20 can be employed as a component of an appliance, such as a thermally insulated appliance. In various examples, the appliance may be capable of passively or actively controlling a thermal environment within the appliance (e.g., a refrigerator, a freezer, a cooler, an oven, etc.). The insulated structure 20 includes a plurality of walls 24. For example, the plurality of walls 24 can include a top wall 28, a bottom wall 32, a first side wall 36, a second side wall 40, an exterior wall 44, and/or an interior wall 48. The first and second side walls 36, 40 each extend between the top and bottom walls 28, 32. Similarly, the exterior wall 44 and the interior wall 48 each extend between the top wall 28, the bottom wall 32, the first side wall 36, and the second side wall 40. The top and bottom walls 28, 32 may define a thickness of the insulated structure 20 and/or a width of the insulated structure 20. The first and second side walls 36, 40 may also define the thickness of the insulated structure 20. Additionally, or alternatively, the first and second side walls 36, 40 may define a height of the insulated structure 20. The exterior wall 44 and the interior wall 48 may extend in the height direction and the width direction of the insulated structure 20. The exterior wall 44 is opposite to the interior wall 48 and is therefore indicated with a phantom lead line. The exterior wall 44 may be closest to a user when the insulated structure 20 is fully assembled with the appliance. The interior wall 48 may be further from the user than the exterior wall 44 when the insulated structure 20 is fully assembled with the appliance. In examples where the insulated structure 20 is employed as at least a portion of an access door (e.g., refrigerator door, cooler door, oven door, etc.), the interior wall 48 may be furthest from the user when the access door is in a closed position.

Referring again to FIGS. 1-10, the plurality of walls 24 define a cavity 52 therebetween. An aperture 56 is defined by one of the plurality of walls 24. In one example, the aperture 56 is defined by the interior wall 48; however, the present disclosure is not so limited. The aperture 56 may be employed in evacuating the cavity 52 to establish a less-than-atmospheric pressure within the cavity 52. The term "atmospheric pressure" is intended to refer to the pressure exerted by the weight of the atmosphere, which at sea level has a mean value of 101,325 Pascals. Said another way, the aperture 56 may be employed in evacuating the cavity 52 to establish a pressure that is less than the environment immediately surrounding the insulated structure 20 at the time of manufacture. A base structure 60 is coupled to an interior surface 64 of the one of the plurality of walls 24 that defines the aperture 56. For example, the base structure 60 may be coupled to the interior surface 64 of the interior wall 48. The base structure 60 is aligned with the aperture 56. A pressure sensor 68 is received by the base structure 60. The base structure 60 and the pressure sensor 68 together define a pressure-sensing assembly 72. In various examples, the pressure sensor 68 may be a microelectromechanical system. A cover 76 may be removably coupled to the one of the plurality of walls 24 that is provided with the pressure-sensing assembly 72. For example, the cover 76 may be removably coupled to the aperture 56 and/or extend over the aperture 56. In various examples, the pressure-sensing assembly 72 fits under the cover 76. A position of the pressure-sensing assembly 72 may remain constant independent of whether the cover 76 is in a coupled state (see FIGS. 2 and 5) or a decoupled state relative to the at least one of the plurality of walls 24 and/or the aperture 56.

Referring now to FIGS. 2-7B, the pressure-sensing assembly 72 may fit below the cover 76 when the cover 76 is in the coupled state. The base structure 60 defines one or more channels 80. In the depicted examples, the one or more channels 80 includes a first channel 84 and a second channel 88. At least one of the one or more channels 80 is positioned over the aperture 56. In the depicted example, the first channel 84 is positioned over the aperture 56. At least one of the one or more channels 80 receives the pressure sensor 68. In the depicted examples, the second channel 88 receives the pressure sensor 68. The first channel 84 and the second channel 88 may be oriented perpendicular to one another. The first channel 84 and the second channel 88 are in fluid communication with one another. The arrangement of the pressure-sensing assembly 72 relative to the aperture 56 enables the sensing, testing, and/or monitoring of a pressure within the cavity 52 of the insulated structure 20 in a manner that does not break a seal of the insulated structure 20. In some examples, the aperture 56 may be employed in evacuating the cavity 52 to establish the pressure that is less-than-atmospheric pressure immediately prior to the coupling of the pressure-sensing assembly 72 to the one of the plurality of walls 24 that defines the aperture 56. In various examples, the base structure 60 may be employed in the evacuating of the cavity 52 to the pressure that is less-than-atmospheric pressure prior to insertion of the pressure sensor 68. Accordingly, after evacuating the cavity 52 to establish the less-than-atmospheric pressure within the cavity 52, the pressure sensor 68 may be inserted into the base structure 60 (e.g., into one of the one or more channels 80) and the base structure 60 may be sealed with the pressure sensor 68 inserted therein, thereby establishing the pressure-sensing assembly 72. In alternative examples, a separate aperture may be defined by one of the plurality of walls 24 and the separate aperture may be employed in the evacuating of the cavity 52 to the pressure that is less-than-atmospheric while the aperture 56 is employed in monitoring the pressure within the cavity 52. In such an example, the aperture 56 may be referred to as a first aperture and the separate aperture may be referred to as a second aperture. The separate, or second, aperture may be defined by the same one of the plurality of walls 24 that defines the aperture 56 or by a different one of the plurality of walls 24 than the one of the plurality of walls 24 that defines the aperture 56.

Referring again to FIGS. 2-7B, the second channel 88 may extend beyond the first channel 84 such that a shelf 92 is provided at a rear of the second channel 88. The rear of the second channel 88 is opposite an opening 96 of the second channel 88. The pressure sensor 68 may rest on the shelf 92 and span a diameter 100 of the first channel 84. Accordingly, the pressure sensor 68 is supported by the second channel 88 in a manner that suspends the pressure sensor 68 over a top of the first channel 84. In some examples, a width 104 of the second channel 88 may be greater than the diameter 100 of the first channel 84. In such examples, a ledge 108 may be positioned on either side of the first channel 84 in the width 104 direction of the second channel 88 such that the pressure sensor 68 is supported by the second channel 88 about an entire circumference of the first channel 84. Supporting the pressure sensor 68 above the first channel 84 may be beneficial in maintaining a position of the pressure sensor 68 within the second channel 88. More specifically, the less-than-atmospheric pressure established within the cavity 52 may exert a force on the pressure sensor 68 by way of the first channel 84. This force exerted by the less-than-atmospheric pressure within the cavity 52 may pull downwardly or inwardly upon the pressure sensor 68 toward the cavity 52 such that a natural tendency of the pressure sensor 68 would be to enter into the first channel 84 if the pressure sensor 68 and/or the first channel 84 were not appropriately sized to prevent such an occurrence. If the pressure sensor 68 were not adequately supported by the second channel 88, electrical leads 112 that are coupled to the pressure sensor 68 may be damaged.

Referring now to FIGS. 2-4C, the opening 96 of the second channel 88 may be sealed in an airtight manner. In one example, a ring cap 116 and a plug 120 may be inserted into a recess 124 defined by the base structure 60. The electrical leads 112 may include sensor pins 130 and plug pins 132. In some examples, the electrical leads 112 may only include the sensor pins 130. In various examples, the plug pins 132 and the plug 120 may be coupled or otherwise assembled prior to insertion into the base structure 60. The ring cap 116 may be assembled to the base structure 60 separately or the ring cap 116, the plug 120, and the plug pins 132 may be assembled as a single subassembly that is simultaneously inserted into the base structure 60. In various examples, the sensor pins 130 may be electrically coupled (e.g., soldered, welded, braised, etc.) prior to assembly with the base structure 60. In some examples, the ring cap 116 may be made of a metallic material. In various examples, the plug 120 may be a glass substrate. The ring cap 116, the plug 120, and/or the plug pins 132 may be coupled to the base structure 60 by an adhesive. For example, an adhesive may be applied to an interior of the recess 124 prior to insertion of the ring cap 116, the plug 120, and the plug pins 132. In such an example, once the adhesive has cured or dried, the pressure-sensing assembly 72 may represent an airtight closure of the aperture 56.

Referring again to FIGS. 2-4C, it is contemplated that the base structure 60 may define a neck 136 that is recessed from immediately adjacent portions of the base structure 60. More specifically, the neck 136 may be defined by an exterior surface of the base structure 60. The neck 136 may be employed in coupling and/or retaining a connector of a pressure-reading assembly. Additionally, or alternatively, the neck 136 may be employed in coupling and/or retaining a hose of a pump assembly that is used to decrease the pressure within the cavity 52. In various examples, the one or more channels 80 may include a plurality of diameters. For example, the second channel 88 may be oblong or rectangular in cross-section such that the width 104 dimension of the second channel 88 may differ from a height 106 dimension of the second channel 88. In some examples, the recess 124 may be considered a portion of the second channel 88 such that the recess 124 defines at least one of the plurality of diameters for the one or more channels 80.

Referring further to FIGS. 2-4C, in some examples, the second channel 88 may extend beyond the first channel 84 such that the second channel 88 defines a hole 126 that is opposite the opening 96. Accordingly, the second channel 88 may extend between ends of the base structure 60 such that the second channel 88 may be referred to as a pass-through channel. In such an example, the hole 126 can be coupled to a conduit 128. The conduit 128 may be used for decreasing the pressure within the cavity 52 while the pressure sensor 68 occupies the second channel 88. Once the desired less-than-atmospheric pressure within the cavity 52 has been reached, the conduit 128 is pinched, crimped, or otherwise sealed off to prevent the conduit 128 from being a source of air or other gaseous component of the environment that could enter the cavity 52 and perturb the desired less-than atmospheric pressure. Accordingly, the conduit 128 may be made from a material that maintains such a pinch, crimp, or other type of seal once the seal has been applied. For example, the conduit 128 may be made of a metallic material (e.g., copper, bronze, stainless steel, etc.).

Figure 7B:
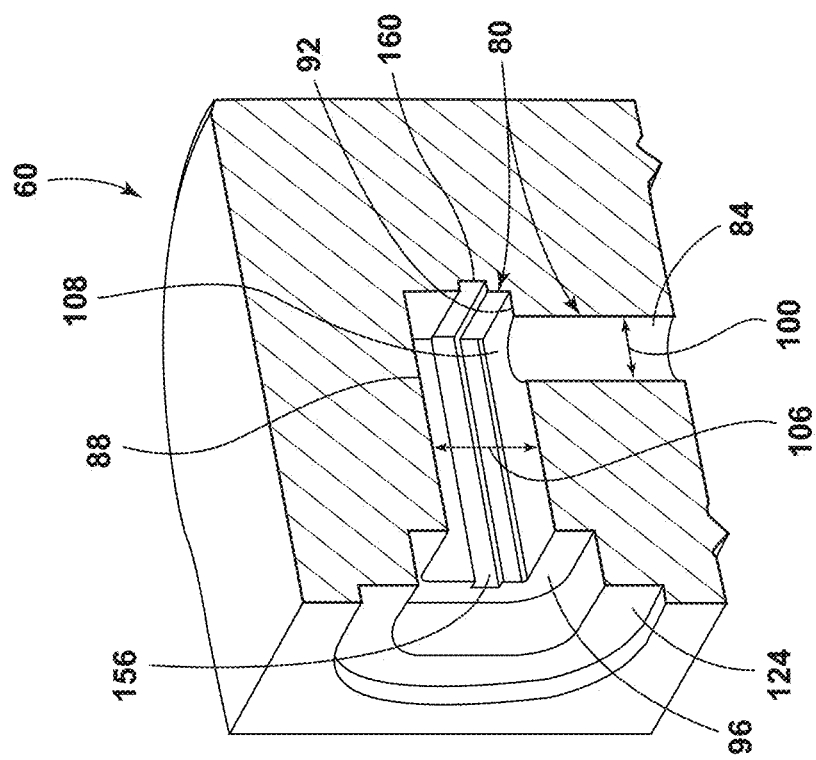
FIG. 7B is a cross-sectional view of the base structure of FIG. 7A, taken along line VIIB-VIIB of FIG. 7A, illustrating an internal arrangement thereof, according to one example.
Figure 7A:
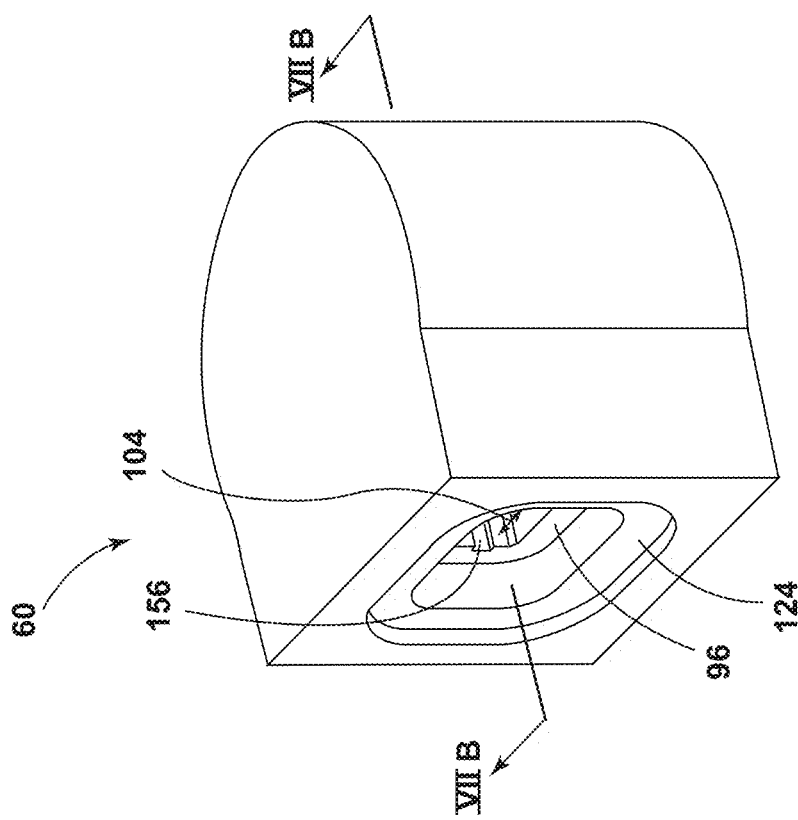
FIG. 7A is a side perspective view of the base structure of the pressure-sensing assembly of FIG. 5, according to one example.
Figure 8B:
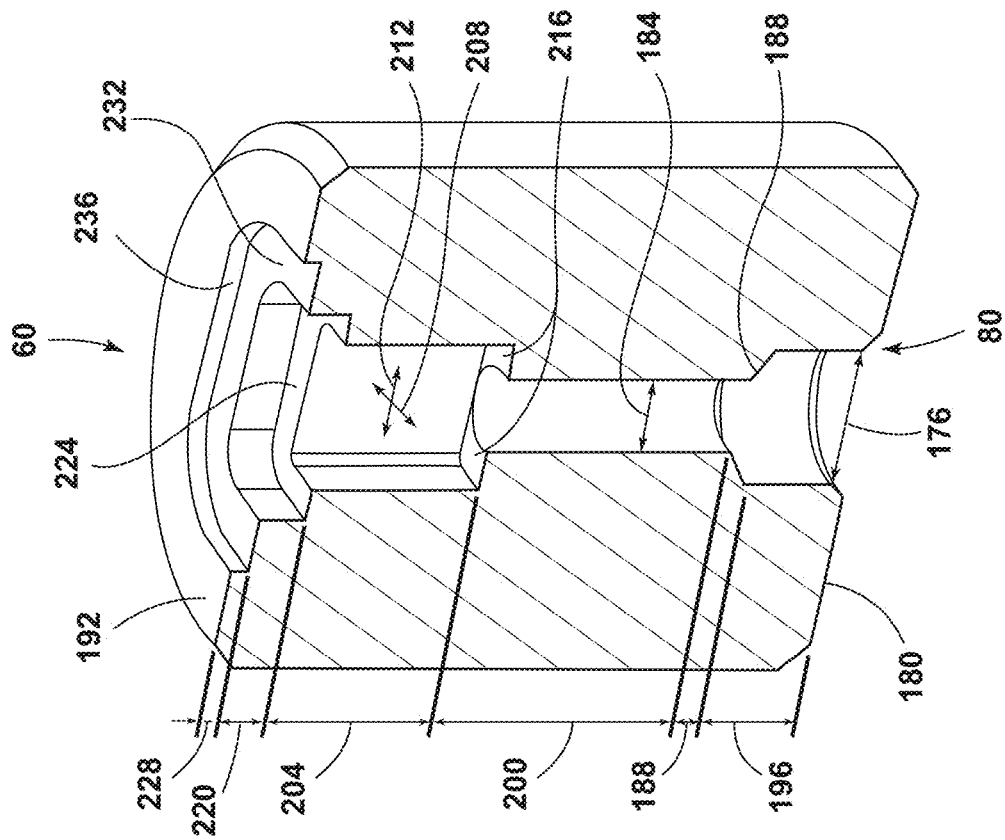
FIG. 8B is a cross-sectional view of the base structure of FIG. 8A, taken along line VIIIB-VIIIB of FIG. 8A, illustrating an internal arrangement thereof, according to one example.
Figure 8A:
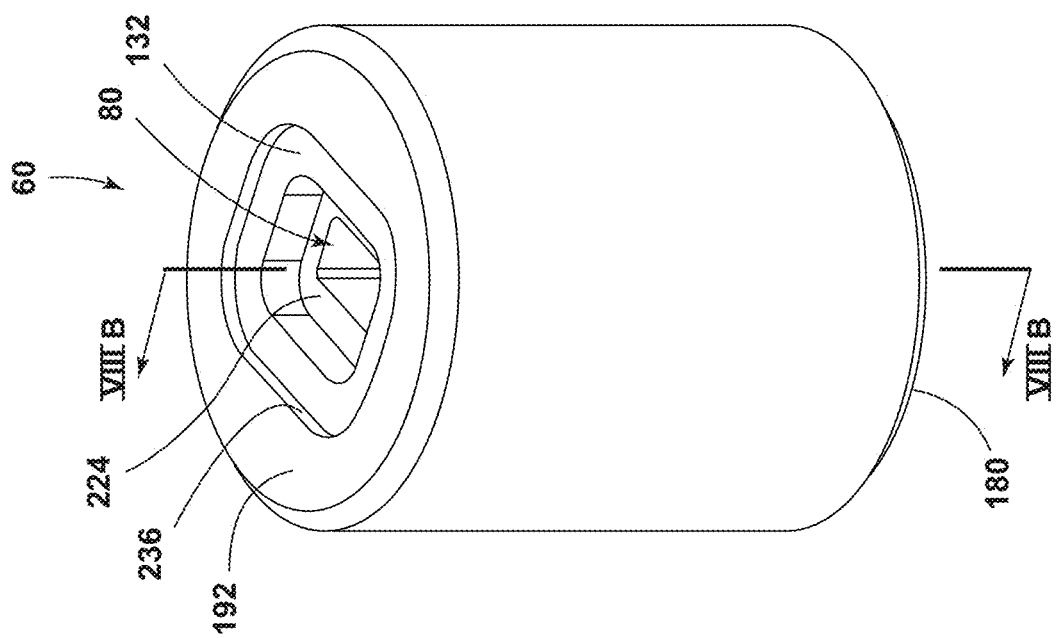
FIG. 8A is a side perspective view of the base structure of the pressure-sensing assembly, according to another example.
Figure 10:
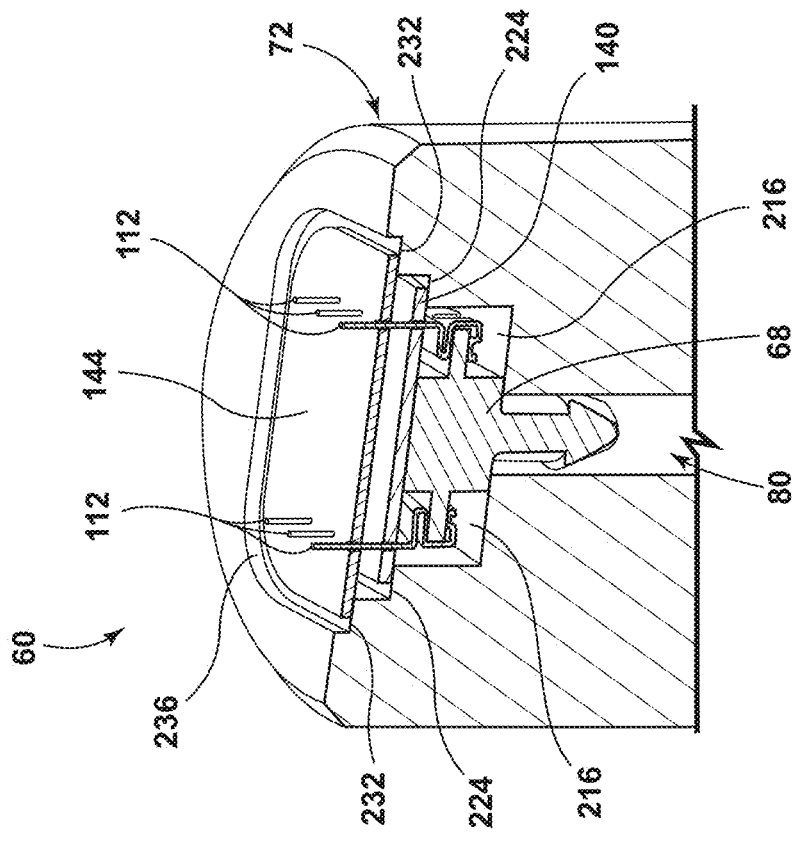
FIG. 10 is a cross-sectional view of the base structure of FIG. 8A, taken along line VIIIB-VIIIB of FIG. 8A, illustrating the pressure sensor coupled thereto, according to another example.
Figure 9:
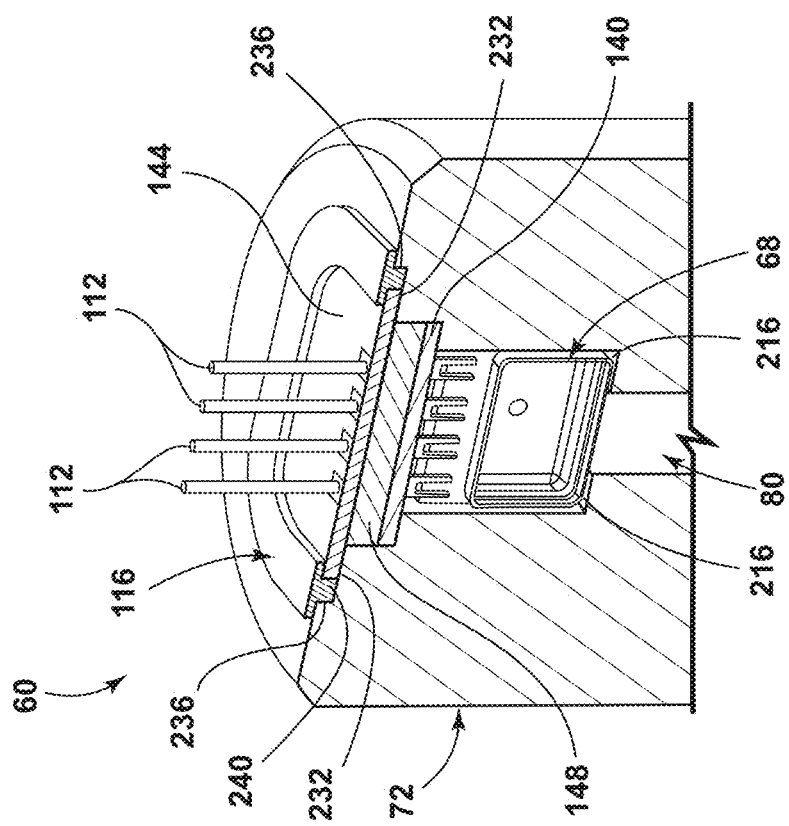
FIG. 9 is a cross-sectional view of the base structure of FIG. 8A, taken along line VIIIB-VIIIB of FIG. 8A, illustrating a pressure sensor coupled thereto, according to one example.

Referring particularly to FIGS. 5-7B, the base structure 60 can include a first polymeric plate 140 and a second polymeric plate 144. The first and second polymeric plates 140, 144 may be coupled to one another by an adhesive 148. The electrical leads 112 of the pressure sensor 68 extend through the first polymeric plate 140 and the second polymeric plate 144. In addition to coupling the first and second polymeric plates 140, 144 to one another, the adhesive 148 may seal holes defined by the first and second polymeric plates 140, 144 through which the electrical leads 112 pass. In various examples, the ring cap 116 may be provided and can serve to retain the pressure sensor 68, the first polymeric plate 140, and the second polymeric plate 144 in position. An adhesive may be applied to the ring cap 116 to retain the ring cap 116 to the base structure 60 and the second polymeric plate 144. The ring cap 116 may have a T-shaped cross-section, where a cross member 152 of the T-shaped cross-section engages with an exterior surface of the base structure 60 and an exterior surface of the second polymeric plate 144. As with the example depicted in FIGS. 2-4C, the one or more channels 80 may include a plurality of diameters. For example, the second channel 88 may be oblong or rectangular in cross-section such that the width 104 dimension of the second channel 88 may differ from the height 106 dimension of the second channel 88. In some examples, the recess 124 may be provided and considered a portion of the second channel 88 such that the recess 124 defines one of the plurality of diameters for the one or more channels 80. The plurality of diameters may be employed to control and/or maintain positioning of the various components of the pressure-sensing assembly 72. In various examples, the second channel 88 may define a lateral slot 156 and/or a rear slot 160. While FIG. 7B depicts a single lateral slot 156, one of skill in the art will recognize that with FIG. 7B being a cross-sectional view, the lateral slot 156 may similarly be positioned on an opposing wall of the second channel 88. The lateral slot 156 and the rear slot 160 may each receive a tab 164 that extends about a perimeter of the pressure sensor 68. The tab 164 may aid in positioning the pressure sensor 68 within the second channel 88 and/or the tab 164 may aid in supporting the pressure sensor 68 above the first channel 84.

Referring now to FIGS. 8A-10, as with the preceding examples, the base structure 60 defines one or more channels 80. In the depicted examples, the one or more channels 80 includes a single channel. Accordingly, the channel 80 defined by the base structure 60 is positioned over the aperture 56. The channel 80 is provided with a plurality of diameters. More specifically, a first diameter 176 is positioned at a bottom 180 of the base structure 60. The first diameter 176 is closest to the aperture 56 when assembled to the insulated structure 20. A second diameter 184 is positioned upward of the first diameter 176. The first diameter 176 may be greater than the second diameter 184. In various examples, the first diameter 176 may transition to the second diameter 184 by way of a sloped region 188 that is defined by the base structure 60. Moving upward toward a top 192 of the base structure 60, the channel 80 may transition from a circular cross-section to a rectangular cross-section. The transition from the circular cross-section to the rectangular cross-section can aid in proper proportioning of the channel 80 to receive the pressure sensor 68. A region of the base structure 60 that defines the first diameter 176 may be referred to as a first circular region 196. A region of the base structure 60 that defines the second diameter 184 may be referred to as a second circular region 200. The first and second circular regions 196, 200 are separated by the sloped region 188.

Referring again to FIGS. 8A-10, positioned immediately adjacent to the second circular region 200 and closer to the top 192 of the base structure 60 is a first rectangular region 204. The first rectangular region 204 may be dimensioned such that at least one dimension chosen from a lateral width 208 and a longitudinal width 212 is greater than the second diameter 184. Accordingly, a first shelf 216 may be defined by the channel 80. The first shelf 216 may be employed as a support for the pressure sensor 68 and/or a depth gauge for the pressure sensor 68. Moving upward from the first rectangular region 204, the channel 80 may define a second rectangular region 220. In the depicted examples, the lateral width 208 and the longitudinal width 212 of the second rectangular region 220 is greater than the lateral width 208 and the longitudinal width 212 of the first rectangular region 204. Accordingly, the second rectangular region 220 defines a second shelf 224 of the channel 80. The second shelf 224 may be a constant thickness or dimension that circumscribes an entirety of a perimeter of the first rectangular region 204. The second shelf 224 may directly support the first polymeric plate 140. In some examples, the second shelf 224 may be dimensioned slightly larger than the first polymeric plate 140 such that, when the adhesive 148 is applied, the adhesive 148 contacts the first polymeric plate 140 and the second shelf 224. Accordingly, the adhesive 148 may be employed to adhere the first and second polymeric plates 140, 144 to one another, as well as to adhere the first polymeric plate 140 to the second shelf 224. Alternatively, the second shelf 224 may be dimensioned to match the dimensions of the first polymeric plate 140 such that the adhesive 148 is prevented from reaching the second shelf 224 in any appreciable amount.

Referring further to FIGS. 8A-10, a third rectangular region 228 is positioned above the second rectangular region 220. The lateral width 208 and the longitudinal width 212 of the third rectangular region 228 may be greater than the lateral width 208 and the longitudinal width 212 of the second rectangular region 220 such that a third shelf 232 is defined thereby. The third shelf 232 receives of the second polymeric plate 144. The third shelf 232 may be dimensioned such that a gap exists between an edge (e.g., a perimeter edge or a circumferential edge) of the second polymeric plate 144 and a perimeter wall 236 of the third rectangular region 228. The gap defined by the edge of the second polymeric plate 144 and the perimeter wall 236 of the third rectangular region 228 is dimensioned to receive the ring cap 116. More specifically, the gap defined by the edge of the second polymeric plate 144 and the perimeter wall 236 of the third rectangular region 228 receives a leg portion 240 of the ring cap 116. As with preceding examples, the cross member 152 of the ring cap 116 extends over an exterior surface of the base structure 60 and an exterior surface of the second polymeric plate 144. Similarly, as with preceding examples, the electrical leads 112 extend through the first polymeric plate 140, the second polymeric plate 144, and the adhesive 148. While specific dimensions and relationships within the one or more channels 80 of the base structure 60 have been described and discussed, the present disclosure is not so limited. Rather, the one or more channels 80 may be dimensioned and/or proportioned to receive a variety of pressure sensors 68, as illustrated in at least FIGS. 9 and 10. Further, the one or more channels 80 can be arranged in a variety of configurations in an effort to suit various applications of the concepts disclosed herein.

According to one aspect of the present disclosure, an insulated structure 20 for an appliance includes a plurality of walls 24, a cavity 52 defined by the plurality of walls 24, and an aperture 56 defined by one of the plurality of walls 24. The aperture 56 is employed in evacuating the cavity 52 to establish a less-than-atmospheric pressure within the cavity 52. A base structure 60 is coupled to an interior surface 64 of the one of the plurality of walls 24 that defines the aperture 56. The base structure 60 is aligned with the aperture 56. A pressure sensor 68 is received by the base structure 60. The base structure 60 and the pressure sensor 68 together define a pressure-sensing assembly 72.

According to another aspect of the present disclosure, a cover 76 is removably coupled to an aperture 56. A position of a pressure-sensing assembly 72 may remain constant independent of whether the cover 76 is in a coupled state or a decoupled state relative to the aperture 56.

According to another aspect of the present disclosure, a pressure-sensing assembly 72 fits below a cover 76 when the cover 76 is in a coupled state.

According to another aspect of the present disclosure, a pressure sensor 68 can be a microelectromechanical system.

According to another aspect of the present disclosure, a base structure 60 defines one or more channels 80.

According to another aspect of the present disclosure, at least one of one or more channels 80 is positioned over an aperture 56.

According to another aspect of the present disclosure, at least one of one or more channels 80 receives a pressure sensor 68.

According to another aspect of the present disclosure, one or more channels 80 includes a plurality of diameters.

According to another aspect of the present disclosure, a pressure-sensing assembly 72 includes a first polymeric plate 140 and a second polymeric plate 144. The second polymeric plate 144 is adhered to the first polymeric plate 140.

According to another aspect of the present disclosure, electrical leads 112 of a pressure sensor 68 can extend through a first polymeric plate 140 and a second polymeric plate 144.

According to another aspect of the present disclosure, one or more channels 80 includes a first channel 84 and a second channel 88. The first channel 84 is positioned over the aperture 56.

According to another aspect of the present disclosure, a second channel 88 receives a pressure sensor 68.

According to another aspect of the present disclosure, a first channel 84 and a second channel 88 are oriented perpendicular to one another.

According to another aspect of the present disclosure, a first channel 84 and a second channel 88 are in fluid communication with one another.

According to another aspect of the present disclosure, an insulated structure 20 for an appliance includes a plurality of walls 24, a cavity 52 defined by the plurality of walls 24, and an aperture 56 defined by one of the plurality of walls 24. The aperture 56 is employed in evacuating the cavity 52 to establish a less-than-atmospheric pressure within the cavity 52. A base structure 60 is coupled to an interior surface 64 of the one of the plurality of walls 24 that defines the aperture 56. The base structure 60 is aligned with the aperture 56. The base structure 60 defines one or more channels 80. At least one of the one or more channels 80 is positioned over the aperture 56. A pressure sensor 68 is received by the base structure 60. The base structure 60 and the pressure sensor 68 together define a pressure-sensing assembly 72. The pressure sensor 68 is a microelectromechanical system. A cover 76 is removably coupled to the aperture 56. A position of the pressure-sensing assembly 72 remains constant independent of whether the cover 76 is in a coupled state or a decoupled state relative to the aperture 56. The pressure-sensing assembly 72 fits below the cover 76 when the cover 76 is in the coupled state.

According to another aspect of the present disclosure, at least one of one or more channels 80 receives a pressure sensor 68. The one or more channels 80 can include a plurality of diameters.

According to another aspect of the present disclosure, a pressure-sensing assembly 72 includes a first polymeric plate 140 and a second polymeric plate 144. The second polymeric plate 144 is adhered to the first polymeric plate 140. Electrical leads 112 of a pressure sensor 68 extend through the first polymeric plate 140 and the second polymeric plate 144.

According to another aspect of the present disclosure, one or more channels 80 includes a first channel 84 and a second channel 88. The first channel 84 is positioned over an aperture 56.

According to another aspect of the present disclosure, a second channel 88 receives a pressure sensor 68. The second channel 88 is in fluid communication with a first channel 84.

According to another aspect of the present disclosure, a first channel 84 and a second channel 88 are oriented perpendicular to one another.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An insulated structure for an appliance, comprising:
a plurality of walls;
a cavity defined by the plurality of walls;
an aperture defined by one of the plurality of walls;
a base structure coupled to an interior surface of the one of the plurality of walls that defines the aperture, wherein the base structure is aligned with the aperture;
a pressure sensor received by the base structure, wherein the base structure and the pressure sensor together define a pressure-sensing assembly; and
a cover that is removably coupled to the aperture, wherein a position of the pressure-sensing assembly remains constant independent of whether the cover is in a coupled state or a decoupled state relative to the aperture.

2. The insulated structure for an appliance of claim 1, wherein the pressure-sensing assembly fits below the cover when the cover is in the coupled state.

3. The insulated structure for an appliance of claim 1, wherein the aperture is employed in evacuating the cavity to establish a less-than-atmospheric pressure within the cavity.

4. The insulated structure for an appliance of claim 1, wherein the base structure defines one or more channels.

5. The insulated structure for an appliance of claim 4, wherein at least one of the one or more channels is positioned over the aperture.

6. The insulated structure for an appliance of claim 5, wherein at least one of the one or more channels receives the pressure sensor.

7. The insulated structure for an appliance of claim 6, wherein the one or more channels comprises a plurality of diameters.

8. The insulated structure for an appliance of claim 6, wherein the pressure-sensing assembly further comprises:
a first polymeric plate; and
a second polymeric plate adhered to the first polymeric plate.

9. The insulated structure for an appliance of claim 8, wherein electrical leads of the pressure sensor extend through the first polymeric plate and the second polymeric plate.

10. The insulated structure for an appliance of claim 9, wherein the one or more channels comprises a first channel and a second channel, and wherein the first channel is positioned over the aperture.

11. The insulated structure for an appliance of claim 10, wherein the second channel receives the pressure sensor.

12. The insulated structure for an appliance of claim 11, wherein the first channel and the second channel are oriented perpendicular to one another.

13. The insulated structure for an appliance of claim 10, wherein the first channel and the second channel are in fluid communication with one another.

14. An insulated structure for an appliance, comprising:
a plurality of walls;
a cavity defined by the plurality of walls;
an aperture defined by one of the plurality of walls, wherein the aperture is employed in evacuating the cavity to establish a less-than-atmospheric pressure within the cavity;
a base structure coupled to an interior surface of the one of the plurality of walls that defines the aperture, wherein the base structure is aligned with the aperture, wherein the base structure defines one or more channels, wherein at least one of the one or more channels is positioned over the aperture;
a pressure sensor that is received by the base structure, wherein the base structure and the pressure sensor together define a pressure-sensing assembly, and wherein the pressure sensor is a microelectromechanical system; and
a cover that is removably coupled to the aperture, wherein a position of the pressure-sensing assembly remains constant independent of whether the cover is in a coupled state or a decoupled state relative to the aperture, wherein the pressure-sensing assembly fits below the cover when the cover is in the coupled state.

15. The insulated structure for an appliance of claim 14, wherein at least one of the one or more channels receives the pressure sensor, and wherein the one or more channels comprises a plurality of diameters.

16. The insulated structure for an appliance of claim 14, further comprising:
a first polymeric plate; and
a second polymeric plate adhered to the first polymeric plate, wherein electrical leads of the pressure sensor extend through the first polymeric plate and the second polymeric plate.

17. The insulated structure for an appliance of claim 16, wherein the one or more channels comprises a first channel and a second channel, and wherein the first channel is positioned over the aperture.

18. The insulated structure for an appliance of claim 17, wherein the second channel receives the pressure sensor, and wherein the first channel and the second channel are in fluid communication with one another.

19. The insulated structure for an appliance of claim 18, wherein the first channel and the second channel are oriented perpendicular to one another.

* * * * *